United States Patent
Morgan

[15] 3,672,003
[45] June 27, 1972

[54] CABLE STRAP

[72] Inventor: Thomas E. Morgan, Cleveland Heights, Ohio

[73] Assignee: International Telephone and Telegraph Corporation, New York, N.Y.

[22] Filed: July 9, 1970

[21] Appl. No.: 53,474

[52] U.S. Cl. ..........................................................24/16 PB
[51] Int. Cl. ......................................................B65d 63/00
[58] Field of Search...................40/21 C; 24/16 PB, 30.5 PB, 24/206 A, 208 A, 73 SA, 73 PB, 17, 20 TT; 248/68, 71, 73, 74, 74 PB

[56] References Cited

UNITED STATES PATENTS 3,106,028  10/1963  Baumgartner....................24/16 PB X
3,127,648  4/1964   Emery................................24/16 PB
3,484,905  12/1969  Eberhardt..........................24/16 PB
3,568,262  3/1971   Woldman...........................24/16 PB
3,368,247  2/1968   Orban................................24/16 PB
3,486,201  12/1969  Bourne..............................24/16 PB Primary Examiner—Donald A. Griffin
Attorney—C. Cornell Remsen, Jr., Walter J. Baum, Paul W. Hemminger, Charles L. Johnson, Jr., Delbert P. Warner, James B. Raden and Marvin M. Chaban

[57] ABSTRACT

The cable tie has an elongated, unitary, flexible strap with an enlarged head at one end. An opening in the head allows the remote strap end to be threaded through the opening in the head to clamp a bundle of wires or the like within the loop so formed. The strap body has an integral flexible pawl extending into the opening to lockingly engage inset ratchet teeth in the strap body adjacent the remote end of the strap.

6 Claims, 3 Drawing Figures

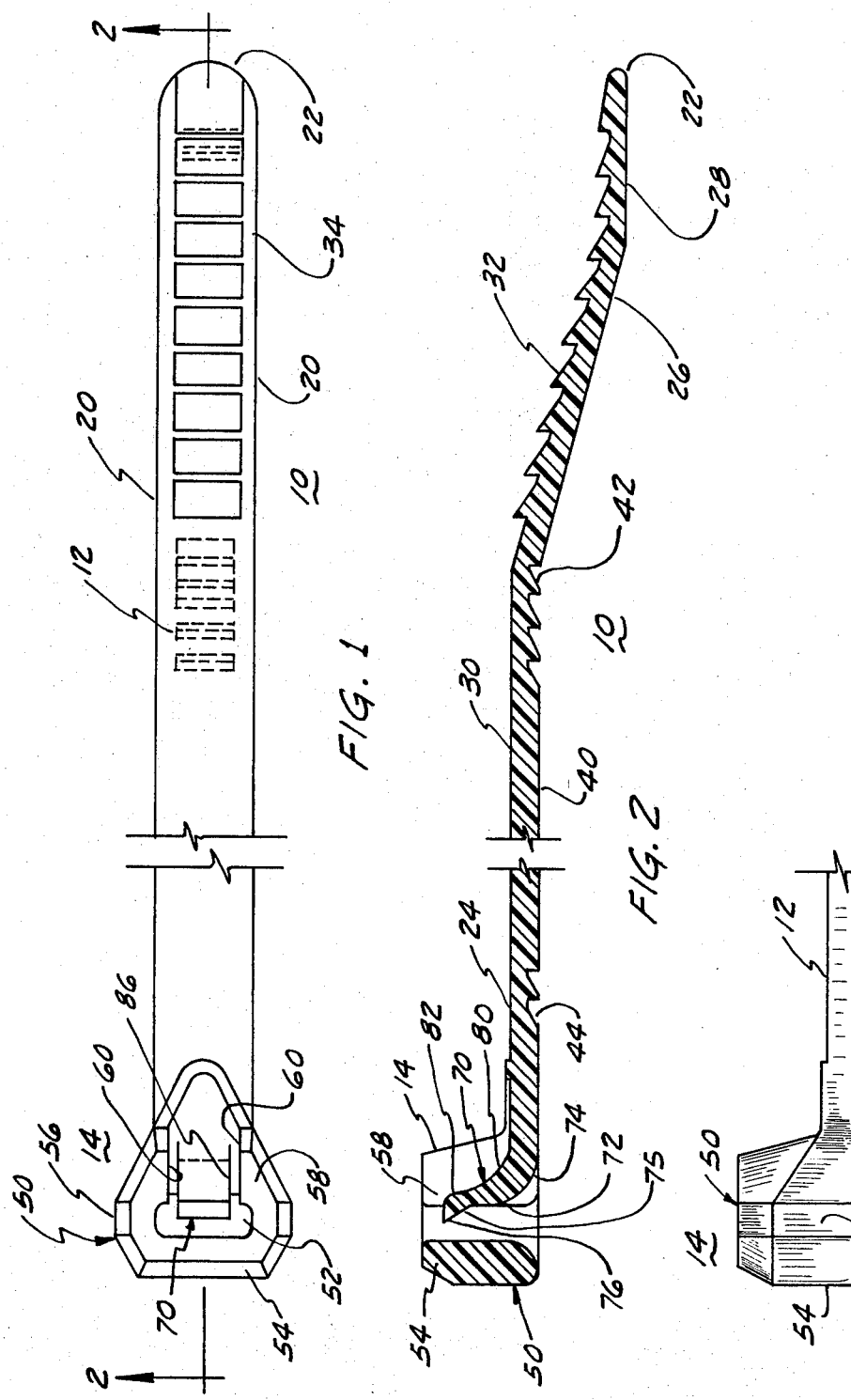
INVENTOR.
THOMAS E. MORGAN 3,672,003

CABLE STRAP

BACKGROUND AND SUMMARY OF THE INVENTION

The invention relates to cable straps (sometimes called bundle ties) adapted to be fabricated as an integral one-piece structure.

The prior art shows many forms of construction of cable ties embodying many variations in component shape and size. Some employ integral one-piece construction including a pawl extending into the head opening, while others use metal pawls embedded in the strap and protruding into the opening. Many variations in the shape of the pawl have been used as the basis for patents, either alone or in combination with the shape of ratchet teeth on the body or tongue of the strap.

The criteria to be met are those of producing a low cost strap capable of being fabricated by mass production techniques and which reliably and tightly clamps and holds a wire or group of wires within the strap loop in a manner allowing ready assembly of the tie.

In meeting these criteria, the present invention utilizes a one-piece construction with a pawl inherently molded into the head, the pawl is relatively flexible and its joinder to the strap body arcuate, the curvature continuing toward the tip of the pawl. The pawl is flexible and terminates in a beveled pawl tip which tightly mates with ratchet teeth formed in the strap body when the strap body is passed through the head. The strap is held firmly and tightly by this mating, binding the cable bundle within the strap loop. The strap head is essentially a U-shaped member integrally connected to the strap body, with the base of the U-shape confronting the pawl, and with the pawl partially filling the open end of the U-shape. The strap head has its outer sidewalls beveled to approximate a hexagonal form to the strap body.

It is therefore an object of the invention to provide a new and improved cable strap.

It is a still further object of the invention to provide a new one-piece cable strap with integrally formed, flexible pawl of novel configuration.

It is a still further object of the invention to provide a cable strap with a new and improved head design.

Other objects, features, and advantages of the invention will become apparent from the following specification and claims taken in conjunction with the drawings, the description of which follows.

BRIEF DESCRIPTION OF THE DRAWINGS

FIG. 1 is a plan view in elevation of a preferred embodiment of a cable strap employing my invention;

FIG. 2 is a sectional view of the strap of FIG. 1, taken along line 2—2 of FIG. 1;

FIG. 3 is a side view in elevation of the head end of the cable strap.

DETAILED DESCRIPTION OF PREFERRED EMBODIMENT

The cable tie or strap 10 shown in the drawings may be provided in a number of lengths and widths, however, the comparative shapes and relationship of the component parts thereof are maintained. Strap 10 includes a main body 12 and an enlarged head 14 connected at one end thereof. The cable tie including both body and head preferably is molded as a unitary member of material such as nylon or suitable flexible plastic such as polypropylene. The main body 12 is of generally rectangular of oblong cross section with parallel sides 20 terminating at its free end in a tongue 22 which may be arcuate as shown, or tapered, as desired.

The body 12 is shown in FIG. 2 may be comparatively flat for a portion 24 of its length nearest head 14. From this flat portion 24, the body 12 is sloped within a ramp portion 26 which terminates in an offset or stepped portion 28 adjacent tongue end 22.

The top surface 30 of a body 12 (as seen best in FIGS. 1 and 2) has a series of serrations 32 which in the form shown extend throughout the offset portion 28. If desired, the extent of the serrations 32 may continue for some of the ramp portion 26. The main purpose of the serrations is to allow the offset portion 28 to be grasped manually for looping or threading of the tongue end through the head. The serrations are bounded by the strap edges 34 at each side 20 of the main body 12, and the roots of the serrations substantially coplanar with the surface 30 and rails 34.

As seen best in FIG. 2, the body under-surface 40 has ratchet teeth indicated by reference characters 42 and 44 incised into the surface up to where the offset begins.

The enlarged head 14 includes a U-shaped main framing member 50 arched about and defining an oblong aperture 52 which extends entirely through the body of the cable strap. The framing member 50 has an end wall 54 normal to the main body 12, the end wall on its outer surface merging into tapered or substantially hexagonal side walls 56 angularly disposed outwardly of the strap body sides 20. The side walls terminate in symmetrical imposts 58 on each side of the oblong aperture. The imposts define the lower longitudinal edges of the oblong aperture, the imposts terminating in interior shoulders 60 parallel to the sides 20 of the main body, and inclined at their outer surface 62 to joinder with the main body.

Within the oblong aperture, as seen best in FIGS. 1 and 2, the main body 12 of the strap has an extension in the form of pawl 70. Pawl 70 is of somewhat lesser thickness than the body 12 and has an arcuate joinder thereto, the pawl curvedly tapering inwardly on the front side 72 from its joinder 74 to the body (shown best in FIG. 2). The pawl extends into the aperture from its joinder and at its remote end, the forwardmost side 72 has an outward bevel 75 from the curved taper to from an edge surface pawl tip 76. The back surface 80 of the pawl has a continuous arcuate shape with a recurved, rounded corner 82 providing a slightly enlarged and strengthened pawl tip 76.

The pawl 70 is separated from the impost walls 60 by lateral spacings 86, the spacings allowing the pawl to maintain a relatively flexible position. The pawl tip 76 intrudes into the space above aperture 52 within the framed head.

Functionally, the longitudinal depth of aperture 52 is slightly greater than the thickness of the main body to provide clearance for the tongue end of the body to be looped through the head aperture with the body under surface 40 adjacent the pawl tip 76. The impost shoulders 60 tend to guide the main body through the aperture and tend to align the body with respect to pawl 70. The end wall 54 of the framing member further supports and guides the tongue end 22 as it passes through the aperture.

In use, the tongue end 22 is passed through the aperture until the serrated portion has cleared the aperture so that the tongue end serrations may be grasped manually and the tongue end pulled through until the ratchet teeth 42 can mate with pawl 70 and lock the cable strap around the object or objects held within the loop thereof, in generally-known fashion. With the tongue end of the strap body looped through the head, the pawl remains within the projection between the imposts and is thereby protected against damage or mishandling. In the normal usage for which the strap is intended, a bundle of wires will be held within the loop so formed so that the wires may be held tightly against one another in a substantially permanent bundle.

The pawl 70, as shown, comprises an extension of the end of the main body 12 and the means of joinder thereto provides a section of some thickness at the joinder. The pawl taper permits flexibility of the pawl as the strap end is threaded therethrough, while the bevelled edge pawl tip will hold securely within the tongue ratchet teeth and will resist tip breakage. The joinder of the pawl bevel 75 to the tapered wall 72 provides an area of secondary flexibility of the pawl tip allowing the pawl tip to be depressed by the body when being threaded through the head in a forward direction, while producing a resistive action to prevent removal.

While there has been described what is at present thought to be the preferred embodiment of the invention, it is understood that changes may be made therein and it is intended to cover in the appended claims, all such modifications which fall within the true spirit and scope of the invention.

What is claimed is:

1. A cable strap of unitary construction comprising an elongated body of generally rectangular cross section with an enlarged, apertured head connected to one end of said body through which the remote end of the strap is adapted to be threaded to form a loop for holding a wire or plurality of wires, the invention wherein said strap head comprises an imposted arch extending normal to the body of the strap and framing the head aperture at the outer end and at both sides, and an elongated, flexible pawl integrally connected to said body and extending freely into the aperture between the imposts, said pawl spaced from said imposts, an alignment of ratchet teeth incised into one face of the strap adjacent said remote strap end, and an angled tip protruding from the pawl facing the end wall, and wherein said pawl is curvedly joined to said strap, the curvature of said pawl joinder continuing for substantially the extent of said pawl, the pawl being of narrower cross section than the tongue body.

2. A strap as claimed in claim 1, wherein said imposts are spaced laterally outwardly of said pawl, and said pawl is positioned longitudinally within the extent of the imposts.

3. A cable strap as claimed in claim 1, wherein said aperture is shaped to conform to the substantially rectangular cross section of said strap with a sliding clearance therebetween on threading of the remote end through the aperture.

4. A cable strap as claimed in claim 1, wherein said head frames said aperture on at least three sides and said imposts provide means on said fourth side for guiding the remote end of the strap into and through said aperture.

5. A cable strap of unitary construction comprising an elongated tongue, a head connected to one end of said tongue, there being an opening in said head normal to said tongue, said head comprising enlarged members upstanding from the plane of said tongue and including a remote end wall and sidewalls combinedly framing said opening on three sides, an elongated, flexible pawl angularly extending from an arcuate connection to the tongue, an edge surface tip of said pawl disposed toward said remote wall and yieldably partially covering said opening, partial extension of said sidewalls joined to said tongue at both sides of said pawl and spaced laterally from said pawl, said side extensions spaced from said remote end wall to provide a clearance passage into said opening for at least the width of said tongue, and wherein said pawl is of lesser cross section than the cross section of the tongue, the pawl tapers from its arcuate connection to the tongue toward the pawl tip, and a beveled surface extends from the pawl tip to the termination of said curved taper.

6. A strap as claimed in claim 5, wherein said tongue extends planarly from the head, and spaced therefrom toward the remote end of said tongue is offset from the previously mentioned plane of said tongue.

* * * * *